April 21, 1925.
W. A. TRYON
SHACKLE
Filed Feb. 9, 1923
1,534,192
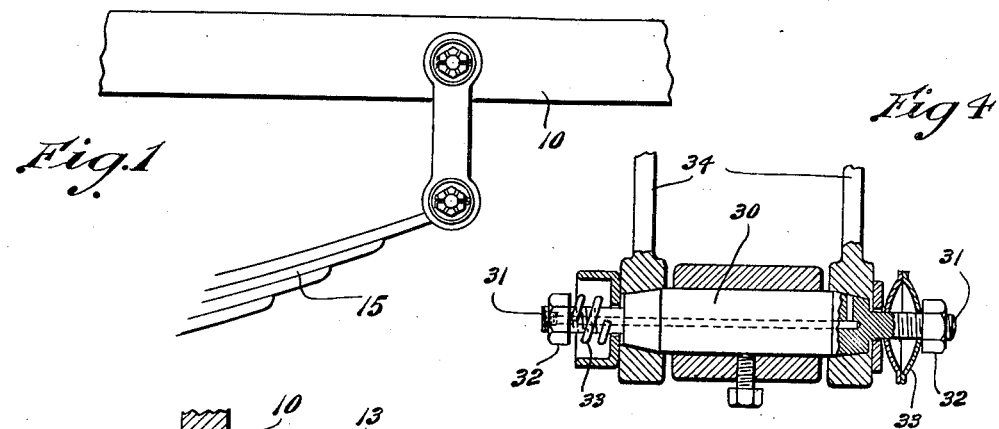
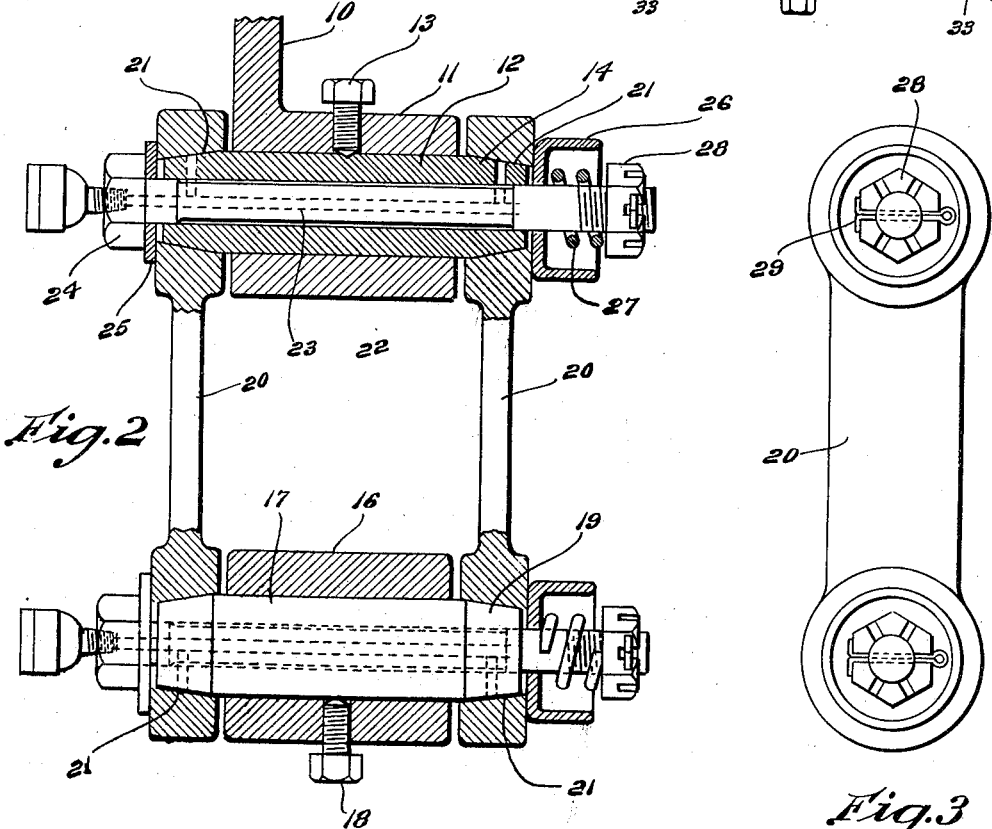
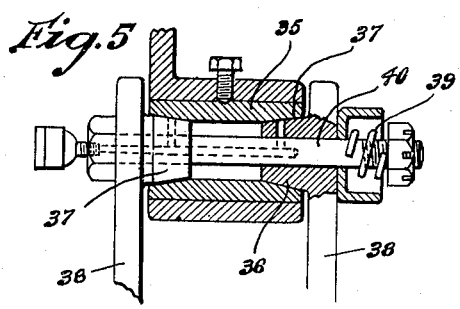
Inventor
William A. Tryon
By Barlow and Barlow
Attorney Patented Apr. 21, 1925.

1,534,192

UNITED STATES PATENT OFFICE.

WILLIAM A. TRYON, OF PROVIDENCE, RHODE ISLAND.

SHACKLE.

Application filed February 9, 1923. Serial No. 618,133.

*To all whom it may concern:*

Be it known that I, WILLIAM A. TRYON, a citizen of the United States, residing at Providence, in the county of Providence and State of Rhode Island, have invented certain new and useful Improvements in Shackles, of which the following is a specification.

This invention relates to improvements in shackles more particularly adapted for use in yieldably connecting vehicle springs to the chassis parts thereof, and is an improvement on my prior Patent No. 1,367,760, February 8, 1921; and the object of this invention is to provide an improved construction of such a shackle adapted to automatically take up the wear of the moving parts to prevent the same from rattling.

With these and other objects in view, the invention consists of certain novel features of construction, as will be more fully described, and particularly pointed out in the appended claims.

In the accompanying drawings:

Figure 1 is a side elevation illustrating a portion of a vehicle spring as connected to the chassis by my improved shackle.

Figure 2 is a sectional side elevation illustrating the general construction of my improved shackle.

Figure 3 is an edge view showing one of the shackle links and the nuts for adjusting the tension of the take-up springs.

Figure 4 is a modification illustrating the bearing pins as provided with an integrally extending threaded portion for the take-up springs on its ends.

Figure 5 is another modification illustrating another modified construction of tapered bearing showing another means by which the wear of the moving parts may be taken up.

It is found in the practical construction and operation of shackles of this character of advantage to provide a construction that can be easily and cheaply manufactured and one which will be effective in its action to automatically take up the wear of the constantly working parts; and the following is a detailed description of one means by which this result may be accomplished:—

With reference to the drawings, 10 designates the frame portion of a vehicle chassis which is provided with a bearing 11 in which a bearing pin member 12 of my improved shackle is designed to fit and which is preferably removably retained in fixed position in this bearing member by means of a binding bolt 13.

The ends 14 of this bearing pin are arranged to project beyond the bearing portion 11 of the chassis and these ends are preferably tapered forming frustro conical bearings.

The free end of the vehicle spring 15 is usually provided with a tubular bearing portion 16 in which another shackle pin 17 is secured by a set screw 18, the ends 19 of this pin being arranged to extend beyond the sides of the bearing portion 16 and are tapered outwardly the same as those of pin 12.

In order to connect these two pins together, I have provided a pair of link members 20, each having a tapered bearing bore 21 in its opposite ends to fit the tapered portions 14 and 19 of the pins 12 and 17, respectively.

In order to yieldably retain these links upon their tapered bearings, I have formed a central hole 22 through the pins 12 and 17 and through each of these holes I have passed a bolt 23 having a head 24 at one end with a washer 25 under the same and a cup-shaped washer 26 at the opposite end in which is mounted a coil spring 27, and a nut 28 is threaded on the outer end of this bolt whereby the tension of the spring may be adjusted to exert the desired pressure upon the opposite links 20 to force them inwardly upon their respective bearing surfaces to automatically take up the wear of these surfaces during constant action of the parts working one upon the other.

In some instances I slot the face of the nut 28 and drill the end of the bolt 23 whereby a cotter pin may be passed through the slot in the nut and the hole in the bolt to lock the nut in adjusted position thereon.

In some instances instead of drilling the bearing pin 12 and passing a bolt therethrough, I form a bearing pin 30, as illustrated in Figure 4, with integrally extending opposite ends 31 on which are threaded nuts 32 to act through springs 33 upon the links 34 to press them onto their tapered ends of the pin and so automatically take up the wear of these constantly moving parts.

As illustrated in Figure 5, I form the inner surfaces at the ends of the bushing 35 tapering as at 36 and provide inwardly extending tapered portions or bosses 37 on the inner faces of the opposite links 38 and I press these tapered bosses into their respective tapering bearings by means of a spring 39 acting through a bolt 40.

My improved construction of shackle is extremely simple, practical and inexpensive to manufacture and it is found in practice that the device is very effective in its operation and by its use the wear of the parts is automatically taken up as it occurs, thus positively preventing the usual rattling of such parts.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. A spring shackle for vehicles comprising a bearing pin removably held at its medial portion in the chassis parts and having tapering protruding opposite ends extending beyond its chassis bearing, a corresponding pin similarly mounted in the spring parts, a pair of parallel spaced apart connecting links having tapering holes to engage the corresponding ends of said pins, and springs at the ends of said pins acting upon said links to automatically take up the wear upon the tapered portions.

2. A spring shackle for vehicles comprising a bearing pin removably held at its medial portion in the chassis parts and having tapering protruding opposite ends, a corresponding pin similarly mounted in the spring parts, a pair of parallel spaced apart connecting links having tapering holes at its ends to engage the corresponding ends of said pins, and a spring at each end of each pin acting upon said links to automatically take up the wear on the tapered surfaces, and means for adjusting the tension of the spring.

3. A spring shackle for vehicles comprising a bearing pin removably held at its medial portion in the chassis parts, and having tapering portions protruding at each of its opposite ends, a corresponding pin similarly mounted in the spring parts, a pair of parallel spaced apart connecting links having a tapering hole near each end to receive the corresponding ends of said pins, a bolt extending through said pin, a coil spring on said bolt acting upon the opposite links to press them inwardly and automatically take up the wear upon the tapered bearings, and a nut on the bolt for adjusting the tension of the spring.

In testimony whereof I affix my signature.

WILLIAM A. TRYON.